US011951588B2

(12) United States Patent
Kinoshita et al.

(10) Patent No.: US 11,951,588 B2
(45) Date of Patent: Apr. 9, 2024

(54) OPTICAL FILM-THICKNESS MEASURING APPARATUS AND POLISHING APPARATUS

(71) Applicant: EBARA CORPORATION, Tokyo (JP)

(72) Inventors: Masaki Kinoshita, Tokyo (JP); Toshifumi Kimba, Tokyo (JP); Yoshikazu Kato, Tokyo (JP); Yoichi Shiokawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 160 days.

(21) Appl. No.: 17/478,608

(22) Filed: Sep. 17, 2021

(65) Prior Publication Data

US 2022/0105601 A1    Apr. 7, 2022

(30) Foreign Application Priority Data

Oct. 6, 2020    (JP) ................. 2020-168845

(51) Int. Cl.
*B24B 37/013*    (2012.01)
*G01N 21/55*    (2014.01)

(52) U.S. Cl.
CPC ........... *B24B 37/013* (2013.01); *G01N 21/55* (2013.01)

(58) Field of Classification Search
CPC ..... B24B 7/228; B24B 37/013; B24B 37/005; B24B 37/205; B24B 49/04; B24B 49/10; B24B 49/12; H01L 21/304; H01L 21/67253; H01L 22/12; H01L 22/26; G01N 21/55; G02B 6/4438; G02B 6/3887; G02B 6/262; G02B 6/4429
USPC .............................................. 451/6, 41, 287
See application file for complete search history.

(56) References Cited

U.S. PATENT DOCUMENTS

| 3,699,237 A * | 10/1972 | Melia ....................... H01B 7/12 |
| | | 174/101.5 |
| 10,399,203 B2 * | 9/2019 | Kobayashi .............. B24B 49/05 |
| 2019/0022820 A1 * | 1/2019 | Kimba .................... B24B 49/12 |

FOREIGN PATENT DOCUMENTS

| CN | 209932668 U * | 1/2020 | ........... B24B 37/013 |
| JP | 2001-088021 A | 4/2001 | |
| JP | 2001-165627 A | 6/2001 | |
| JP | 2020-104191 A | 7/2020 | |

(Continued)

OTHER PUBLICATIONS

Machine translation of CN-209932668-U (Year: 2020).*
Machine translation of WO-0067951-A1 (Year: 2000).*

*Primary Examiner* — Joel D Crandall
*Assistant Examiner* — Robert F Neibaur
(74) *Attorney, Agent, or Firm* — BakerHostetler

(57) ABSTRACT

An optical film-thickness measuring apparatus capable of eliminating an influence of a fluid flow on optical fiber cables when the fluid, such as pure water, is flowing through a through-hole of a polishing pad, and capable of achieving highly accurate measuring of a film thickness is disclosed. The optical film-thickness measuring apparatus includes: a light-emitting optical fiber cable coupled to a light source; a light-receiving optical fiber cable arranged to receive light reflected from the workpiece; a cable housing surrounding the light-emitting optical fiber cable and the light-receiving optical fiber cable; and a flow-passage structure defining a fluid passage adjacent to the light-emitting optical fiber cable and the light-receiving optical fiber cable. The light-emitting optical fiber cable and the light-receiving optical fiber cable are supported by at least one of the cable housing and the flow-passage structure.

11 Claims, 10 Drawing Sheets

(56) References Cited

FOREIGN PATENT DOCUMENTS

| WO | WO-0067951 A1 * | 11/2000 | ........... B24B 37/013 |
| WO | WO 2001/020304 A2 | 3/2001 | |

* cited by examiner

OPTICAL FILM-THICKNESS MEASURING APPARATUS AND POLISHING APPARATUS

CROSS REFERENCE TO RELATED APPLICATION

This document claims priority to Japanese Patent Application No. 2020-168845 filed Oct. 6, 2020, the entire contents of which are hereby incorporated by reference.

BACKGROUND

Wafer polishing is typically performed using a chemical mechanical polishing apparatus (or a CMP apparatus). The CMP apparatus is configured to polish a surface of a wafer by rubbing the wafer against a polishing pad while supplying a polishing liquid onto the polishing pad attached to a polishing table. Polishing of the wafer is terminated when a thickness of a film (dielectric film, metal film, silicon layer, etc.) constituting the surface of the wafer reaches a predetermined target value. Therefore, the film thickness is measured during polishing of the wafer.

One example of a film-thickness measuring apparatus is an optical film-thickness measuring apparatus configured to measure the film thickness by guiding light to the surface of the wafer and analyzing optical information contained in the reflected light from the wafer. This optical film-thickness measuring apparatus includes a light-emitting optical fiber cable and a light-receiving optical fiber cable arranged in the polishing table. The light emitted from the light-emitting optical fiber cable is directed to the wafer through a through-hole of the polishing pad, and the reflected light from the wafer passes through the through-hole again to reach the light-receiving optical fiber cable. The optical film-thickness measuring apparatus determines the film thickness of the wafer based on a spectrum of the reflected light received by the light-receiving optical fiber cable.

During polishing of the wafer, the polishing liquid is supplied onto the polishing pad. The polishing liquid flows into the through-hole of the polishing pad and hinders traveling of the light. Thus, pure water is supplied into the through-hole from inside the polishing table in order to secure a light path. The through-hole is filled with the pure water, and the polishing liquid and polishing debris that have entered the through-hole are discharged together with the pure water through a drain line. The flow of pure water formed in the through-hole ensures the light path and enables highly accurate measuring of the film thickness.

However, when the pure water flows toward the through-hole of the polishing pad, the pure water comes into contact with the light-emitting optical fiber cable and the light-receiving optical fiber cable arranged in the polishing table. This flow of pure water may displace or vibrate the light-emitting optical fiber cable and the light-receiving optical fiber cable. Such displacement or vibration of the optical fiber cables may change the spectrum of the reflected light. High accuracy has recently been required for wafer film-thickness measurement, and the conventional optical film-thickness measuring apparatus may not meet such a requirement for highly accurate measuring of the film thickness.

SUMMARY

Therefore, there is provided an optical film-thickness measuring apparatus capable of eliminating an influence of a fluid flow on optical fiber cables when the fluid, such as pure water, is flowing through a through-hole of a polishing pad, and capable of achieving highly accurate measuring of a film thickness. Further, there is provided a polishing apparatus including with such an optical film-thickness measuring apparatus.

Embodiments, which will be described below, relate to an optical film-thickness measuring apparatus for measuring a film thickness of a workpiece, such as a wafer, a substrate, or a panel, used for manufacturing semiconductor devices, and more particularly to an optical film-thickness measuring apparatus for measuring a film thickness of a workpiece while the workpiece is polished on a polishing pad.

In an embodiment, there is provided an optical film-thickness measuring apparatus to be installed in a polishing apparatus for a workpiece, comprising: a light source; a light-emitting optical fiber cable coupled to the light source; a light-receiving optical fiber cable arranged to receive light reflected from the workpiece; a spectrometer configured to measure intensity of the reflected light at each of wavelengths; a data processing device configured to calculate a film thickness of the workpiece from measurement data of the intensity of the reflected light; a cable housing surrounding the light-emitting optical fiber cable and the light-receiving optical fiber cable; and a flow-passage structure defining a fluid passage adjacent to the light-emitting optical fiber cable and the light-receiving optical fiber cable, the light-emitting optical fiber cable and the light-receiving optical fiber cable being supported by at least one of the cable housing and the flow-passage structure.

In an embodiment, respective ends of the light-emitting optical fiber cable and the light-receiving optical fiber cable are in contact with at least one of the cable housing and the flow-passage structure.

In an embodiment, the light-emitting optical fiber cable and the light-receiving optical fiber cable are adhered to each other by an adhesive.

In an embodiment, the light-emitting optical fiber cable and the light-receiving optical fiber cable are fixed to at least one of the cable housing and the flow-passage structure with an adhesive.

In an embodiment, the light-emitting optical fiber cable and the light-receiving optical fiber cable are sandwiched between the cable housing and the flow-passage structure.

In an embodiment, the light-emitting optical fiber cable and the light-receiving optical fiber cable are held by a filler that fills a space between the cable housing and the flow-passage structure.

In an embodiment, the optical film-thickness measuring apparatus further comprises a buffer tank coupled to the flow-passage structure, the fluid passage communicating with an inside of the buffer tank.

In an embodiment, there is provided a polishing apparatus comprising: a polishing table for supporting a polishing pad; a polishing head configured to press a workpiece against the polishing pad; and the optical film-thickness measuring apparatus.

According to the above-described embodiments, the light-emitting optical fiber cable and the light-receiving optical fiber cable are supported by at least one of the cable housing and the flow-passage structure. Therefore, even if fluid, such as pure water, flows through the fluid passage, the flow of fluid does not displace or vibrate the optical fiber cables. As a result, the optical film-thickness measuring apparatus can highly accurately measure the film thickness of the workpiece.

DESCRIPTION OF EMBODIMENTS

Hereinafter, embodiments will be described with reference to the drawings.

Figure 1:
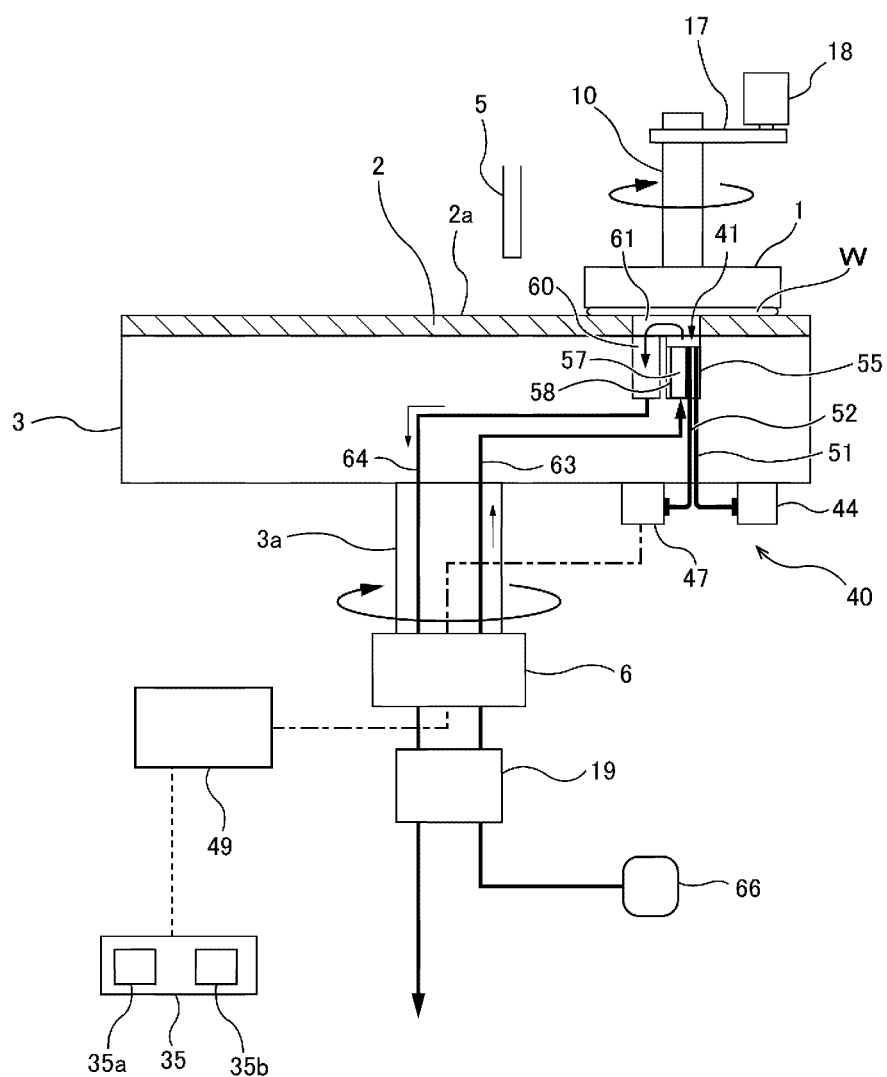
FIG. 1 is a schematic view showing an embodiment of a polishing apparatus.

FIG. 1 is a schematic view showing an embodiment of a polishing apparatus. As shown in FIG. 1, the polishing apparatus includes a polishing table 3 configured to support a polishing pad 2, a polishing head 1 configured to press a workpiece W, such as a wafer, a substrate, or a panel, against the polishing pad 2, and a polishing-liquid supply nozzle 5 configured to supply a polishing liquid (e.g., slurry) onto a polishing surface 2a of the polishing pad 2, and a table motor 6 configured to rotate the polishing table 3.

The polishing head 1 is coupled to a head shaft 10, and the polishing head 1 is rotatable together with the head shaft 10. The head shaft 10 is coupled to a polishing head motor 18 via a coupling device 17, such as belt, so that the head shaft 10 is rotated by the polishing head motor 18. This rotation of the head shaft 10 is transmitted to the polishing head 1 to rotate the polishing head 1 in a direction indicated by arrow. The polishing table 3 has a table shaft 3a, which is coupled to the table motor 6. This table motor 6 is configured to rotate the polishing table 3 and the polishing pad 2 in a direction indicated by arrow.

The polishing apparatus includes an operation controller 35 configured to control operations of the polishing apparatus. The operation controller 35 is composed of at least one computer. The operation controller 35 includes a memory 35a storing programs therein and a processor 35b for performing arithmetic operations according to instructions contained in the programs. The memory 35a includes a main memory, such as random-access memory (RAM), and an auxiliary memory, such as a hard disk drive (HDD) or a solid state drive (SSD). Examples of the processor 35b include a CPU (central processing unit) and a GPU (graphic processing unit). However, the specific configurations of the operation controller 35 are not limited to these examples.

The polishing apparatus includes an optical film-thickness measuring apparatus 40 configured to determine a film thickness of the workpiece W. The optical film-thickness measuring apparatus 40 includes an optical sensor head 41, a light source 44, a spectrometer 47, and a data processing device 49. The optical sensor head 41, the light source 44, and the spectrometer 47 are secured to the polishing table 3, and rotate together with the polishing table 3 and the polishing pad 2. The position of the optical sensor head 41 is such that the optical sensor head 41 sweeps across the surface of the workpiece W on the polishing pad 2 each time the polishing table 3 and the polishing pad 2 make one rotation. The optical sensor head 41 is coupled to the light source 44 and the spectrometer 47. The spectrometer 47 is coupled to the data processing device 49.

The light source 44 transmits the light to the optical sensor head 41, and the optical sensor head 41 emits the light to the workpiece W. The reflected light from the workpiece W is received by the optical sensor head 41 and transmitted to the spectrometer 47. The spectrometer 47 decomposes the reflected light according to its wavelength and measures the intensity of the reflected light at each of the wavelengths. The spectrometer 47 sends measurement data of the intensity of the reflected light to the data processing device 49. The data processing device 49 produces a spectrum of the reflected light from the measurement data of the intensity of the reflected light. This spectrum indicates a relationship between the intensity and the wavelength of the reflected light, and the shape of the spectrum varies according to the film thickness of the workpiece W. The data processing device 49 determines the film thickness of the workpiece W from the spectrum.

Polishing of the workpiece W is performed as follows. The polishing-liquid supply nozzle 5 supplies the polishing liquid onto the polishing surface 2a of the polishing pad 2 on the polishing table 3, while the polishing table 3 and the polishing head 1 are rotated in the directions indicated by arrows in FIG. 1. While the workpiece W is being rotated by the polishing head 1, the workpiece W is pressed by the polishing head 1 against the polishing surface 2a of the polishing pad 2 in the presence of the polishing liquid on the polishing pad 2. The surface of the workpiece W is polished by a chemical action of the polishing liquid and a mechanical action of abrasive grains contained in the polishing liquid and the polishing pad 2.

During polishing the workpiece W, each time the polishing table 3 makes one rotation, the optical sensor head 41 irradiates multiple measurement points on the workpiece W with the light and receives the reflected light from the workpiece W, while the optical sensor head 41 is moving across the workpiece W on the polishing pad 2. The data processing device 49 determines the film thickness of the workpiece W from the measurement data of the intensity of the reflected light.

The details of the optical film-thickness measuring apparatus 40 will be described below. The optical film-thickness measuring apparatus 40 includes a light-emitting optical fiber cable 51 arranged to direct the light, emitted by the light source 44, to the surface of the workpiece W, and a light-receiving optical fiber cable 52 arranged to receive the reflected light from the workpiece W and transmit the reflected light to the spectrometer 47. An end of the light-emitting optical fiber cable 51 and an end of the light-receiving optical fiber cable 52 are located in the polishing table 3. The end of the light-emitting optical fiber cable 51 and the end of the light-receiving optical fiber cable 52 constitute the optical sensor head 41 that directs the light to the surface of the workpiece W and receives the reflected light from the workpiece W. The other end of the light-emitting optical fiber cable 51 is coupled to the light source 44, and the other end of the light-receiving optical fiber cable 52 is coupled to the spectrometer 47. The spectrometer 47 is configured to decompose the reflected light from the workpiece W according to wavelength and measure intensities of the reflected light over a predetermined wavelength range.

The polishing table 3 has a dram passage 60 which opens in an upper surface of the polishing table 3. The polishing pad 2 has a through-hole 61 at a position corresponding to the optical sensor head 41 and the drain passage 60. The optical sensor head 41 and the dram passage 60 are in fluid communication with the through-hole 61, which opens in the polishing surface 2a. The optical sensor head 41, composed of the end of the light-emitting optical fiber cable 51 and the end of the light-receiving optical fiber cable 52, is located below the through-hole 61.

The light source 47 may comprise a pulsed light source, such as xenon flash lamp. The light-emitting optical fiber cable 51 is an optical transmission element for transmitting the light, emitted by the light source 44, to the surface of the workpiece W. The distal ends of the light-emitting optical fiber cable 51 and the light-receiving optical fiber cable 52 lie in the polishing table 3, and are located near the surface, to be polished, of the workpiece W. The optical sensor head 41, composed of the distal end of the light-emitting optical fiber cable 51 and the distal end of the light-receiving optical fiber cable 52, is arranged so as to face the workpiece W held by the polishing head 1, so that multiple measurement points of the workpiece W are irradiated with the light each time the polishing table 3 makes one revolution. Only one optical sensor head 41 is provided in this embodiment, while a plurality of optical sensor heads 41 may be provided.

During polishing of the workpiece W, the light is directed from the optical sensor head 41 to the workpiece W through the through-hole 61, and the reflected light from the workpiece W is received by the optical sensor head 41 through the through-hole 61. The spectrometer 47 measures the intensity of the reflected light at each of the wavelengths over the predetermined wavelength range and sends the measurement data obtained to the data processing device 49. This measurement data is a film-thickness signal varying in accordance with the film thickness of the workpiece W. The data processing device 49 produces a spectrum showing the light intensities at the respective wavelengths from the measurement data, and determines the film thickness of the workpiece W from the spectrum.

Figure 2:
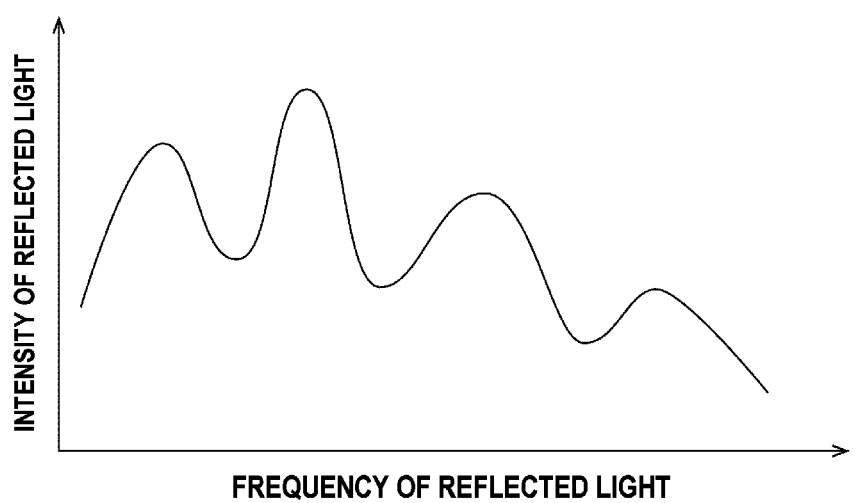
FIG. 2 is a diagram showing an example of a spectrum of reflected light from a workpiece.

FIG. 2 is a diagram showing an example of the spectrum of the reflected light. A vertical axis of FIG. 2 represents the intensity of the reflected light, and a horizontal axis represents the frequency of the reflected light. The spectrum of the reflected light varies according to the thickness of the film of the workpiece W. Therefore, the data processing device 49 can determine the film thickness of the workpiece W from the spectrum of the reflected light. A known method is used for determining the film thickness of the workpiece W from the spectrum of the reflected light. For example, the data processing device 49 performs a Fourier transform operation on the spectrum of the reflected light and determines a film thickness from a frequency spectrum obtained. In another example, the data processing device 49 determines a reference spectrum having a shape closest to that of the spectrum of the reflected light and determines a film thickness associated with the determined reference spectrum.

The optical film-thickness measuring apparatus 40 includes a cable housing 55 surrounding the light-emitting optical fiber cable 51 and the light-receiving optical fiber cable 52, and a flow-passage structure 58 that defines a fluid passage 57 adjacent to the light-emitting optical fiber cable 51 and the light-receiving optical fiber cable 52. The cable housing 55 and the flow-passage structure 58 are arranged in the polishing table 3. The fluid passage 57 is coupled to a fluid supply line 63, and the drain passage 60 is coupled to a drain line 64. During polishing of the workpiece W, a fluid, such as pure water, is supplied to the fluid passage 57 and the through-hole 61 via the fluid supply line 63 to fill the fluid passage 57 and the through-hole 61. The fluid further flows from the through-hole 61 into the drain passage 60 and is discharged through the drain line 64. The polishing liquid is discharged together with the fluid, which can ensure the optical path.

The fluid supply line 63 and the drain line 64 are coupled to a rotary joint 19, which is coupled to the table shaft 3a of the polishing table 3. The fluid supply line 63 and the drain line 64 extend in the polishing table 3. One end of the fluid supply line 63 is coupled to the fluid passage 57 of the flow-passage structure 58. The other end of the fluid supply line 63 is coupled to a fluid supply source 66. In this embodiment, pure water, which is an example of a light-transmissive liquid, is used as the fluid, but the fluid may be another light-transmissive liquid, or may be a gas, such as air or an inert gas. The fluid supply source 66 may be a pure water supply source as a utility supply source provided in a factory where the polishing apparatus is installed.

Figure 3:
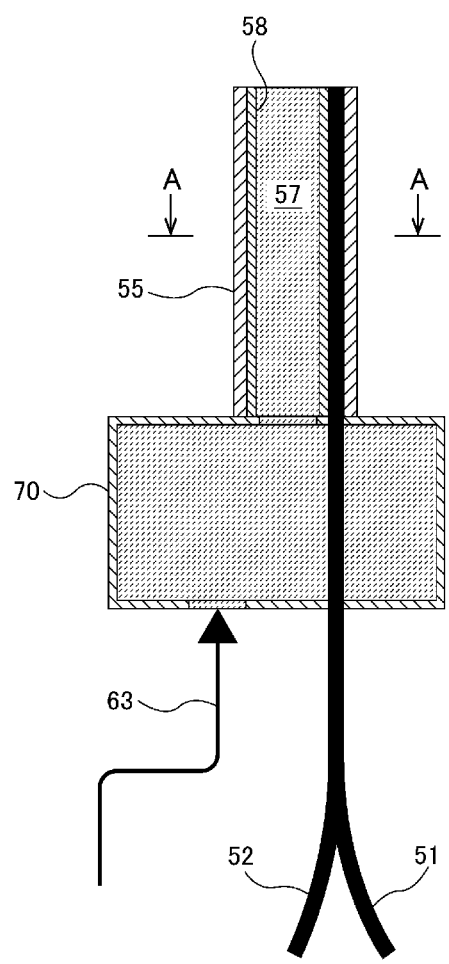
FIG. 3 is an enlarged cross-sectional view of a cable housing and a flow-passage structure shown in FIG. 1.
Figure 4:
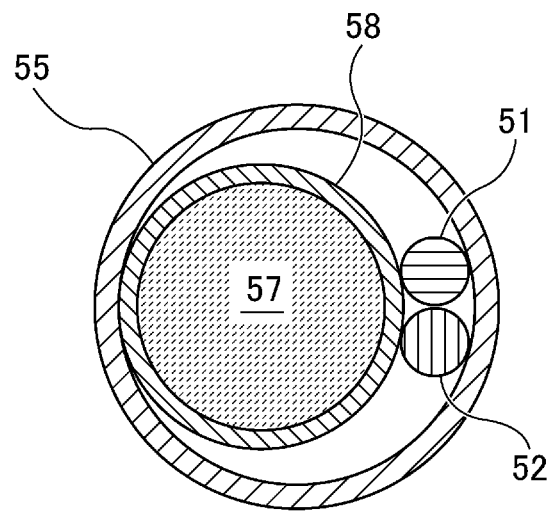
FIG. 4 is a cross-sectional view taken along line A-A of FIG. 3.

FIG. 3 is an enlarged cross-sectional view of the cable housing 55 and the flow-passage structure 58 shown in FIG. 1, and FIG. 4 is a cross-sectional view taken along line A-A of FIG. 3. As shown in FIGS. 3 and 4, the distal ends of the light-emitting optical fiber cable 51 and the light-receiving optical fiber cable 52 are arranged in the cable housing 55. The flow-passage structure 58 having the fluid passage 57 therein is also arranged in the cable housing 55. The light-emitting optical fiber cable 51 and the light-receiving optical fiber cable 52 are arranged outside the flow-passage structure 58 and inside the cable housing 55.

The flow-passage structure 58 is coupled to a buffer tank 70. More specifically, the buffer tank 70 is coupled to a lower end of the flow-passage structure 58, and the fluid passage 57 communicates with the inside of the buffer tank 70. The fluid supply line 63 is coupled to the buffer tank 70. Therefore, the fluid passage 57 communicates with the fluid supply line 63 via the buffer tank 70. The fluid (for example, pure water) is temporarily stored in the buffer tank 70 and then flows into the fluid passage 57. The buffer tank 70 has a function of stabilizing a flow rate of the fluid flowing into the fluid passage 57.

As shown in FIG. 4, the light-emitting optical fiber cable 51 and the light-receiving optical fiber cable 52 are supported by (or in contact with) both the cable housing 55 and the flow-passage structure 58. In particular, the distal ends of the optical fiber cables 51 and 52 are in contact with both the cable housing 55 and the flow-passage structure 58. Therefore, the light-emitting optical fiber cable 51 and the light-receiving optical fiber cable 52 are not displaced or vibrated by the flow of the fluid emitted from the fluid passage 57. In particular, in the present embodiment, the distal end of the light-emitting optical fiber cable 51 and the distal end of the light-receiving optical fiber cable 52 are sandwiched between an inner surface of the cable housing 55 and an outer surface of the flow-passage structure 58. According to such an arrangement, the positions of the light-emitting optical fiber cable 51 and the light-receiving optical fiber cable 52 (particularly, the positions of their distal ends) can be firmly fixed.

In the present embodiment, the light-emitting optical fiber cable 51 and the light-receiving optical fiber cable 52 are arranged outside the flow-passage structure 58 forming the fluid passage 57 through which the fluid (for example, pure water) flows. Therefore, the fluid flowing through the fluid passage 57 does not contact the optical fiber cables 51 and 52. As a result, displacement or vibration of the optical fiber cables 51 and 52 (particularly their distal ends) can be reliably prevented.

In the present embodiment, the light-emitting optical fiber cable 51 and the light-receiving optical fiber cable 52 are adhered to each other by an adhesive (not shown in the drawings). In particular, the distal end of the light-emitting optical fiber cable 51 and the distal end of the light-receiving optical fiber cable 52 are adhered to each other by the adhesive. With this configuration, one of the optical fiber cables 51 and 52 restrains the other, which makes it difficult for the optical fiber cables 51 and 52 to be displaced or vibrated.

Figure 5:
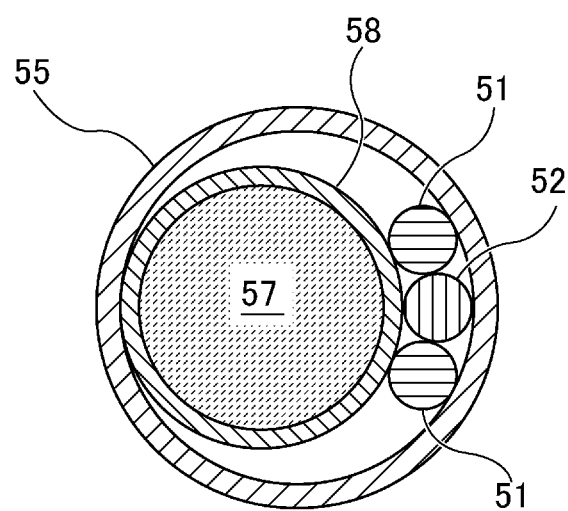
FIG. 5 is a cross-sectional view showing another embodiment of arrangement of optical fiber cables, cable housing, and flow-passage structure.

A plurality of light-emitting optical fiber cables 51 and a plurality of light-receiving optical fiber cables 52 may be provided. For example, as shown in FIG. 5, in order to increase the amount of light directed to the workpiece W, a plurality of light-emitting optical fiber cables 51 may be provided. A plurality of light-receiving optical fiber cables 52 may also be provided.

The light-emitting optical fiber cable 51 and the light-receiving optical fiber cable 52 (particularly their distal ends) may be fixed to one or both of the cable housing 55 and the flow-passage structure 58 with an adhesive (not shown in the drawings). For example, the light-emitting optical fiber cable 51 and the light-receiving optical fiber cable 52 may be fixed to the inner surface of the cable housing 55 with an adhesive. In this case, these optical fiber cables 51 and 52 may not be in contact with the flow-passage structure 58. In another example, the light-emitting optical fiber cable 51 and the light-receiving optical fiber cable 52 may be fixed to the outer surface of the flow-passage structure 58 with an adhesive. In this case, these optical fiber cables 51 and 52 may not be in contact with the cable housing 55.

Figure 6:
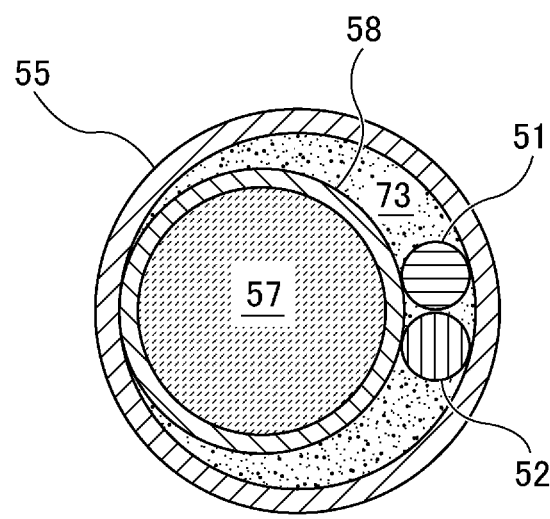
FIG. 6 is a cross-sectional view showing still another embodiment of arrangement of optical fiber cables, cable housing, and flow-passage structure.

In one embodiment, as shown in FIG. 6, the light-emitting optical fiber cable 51 and the light-receiving optical fiber cable 52 (particularly their distal ends) may be held by a filler 73 that fills a space between the cable housing 55 and the flow-passage structure 58. In the embodiment shown in FIG. 6, the filler 73 fills the space between the inner surface of the cable housing 55 and the outer surface of the flow-passage structure 58. Examples of the filler 73 include materials having airtight and waterproof properties, such as putty and sealant. The filler 73 holds the light-emitting optical fiber cable 51 and the light-receiving optical fiber cable 52 and can fix their positions.

Figure 7:
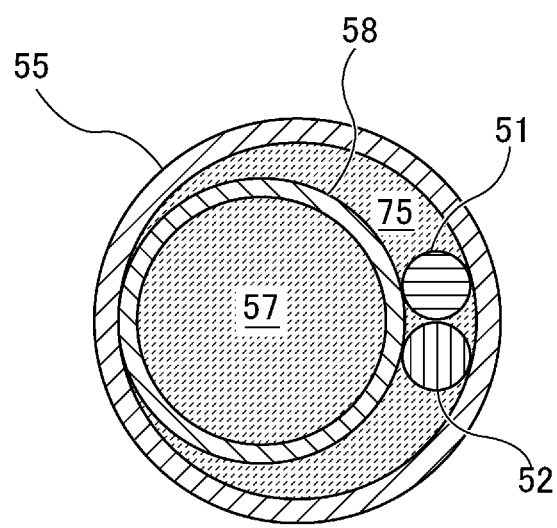
FIG. 7 is a cross-sectional view showing still another embodiment of arrangement of optical fiber cables, cable housing, and flow-passage structure.

In one embodiment, as shown in FIG. 7, in addition to the fluid passage (or first fluid passage) 57 in the flow-passage structure 58, a second fluid passage 75 for the fluid (e.g., pure water) may be formed between the cable housing 55 and the flow-passage structure 58 in order to increase the flow rate of the fluid. In the embodiment shown in FIG. 7, the optical fiber cables 51 and 52 may be sandwiched between the cable housing 55 and the flow-passage structure 58, or may be adhered to one or both of the cable housing 55 and the flow-passage structure 58 with an adhesive.

Figure 8:
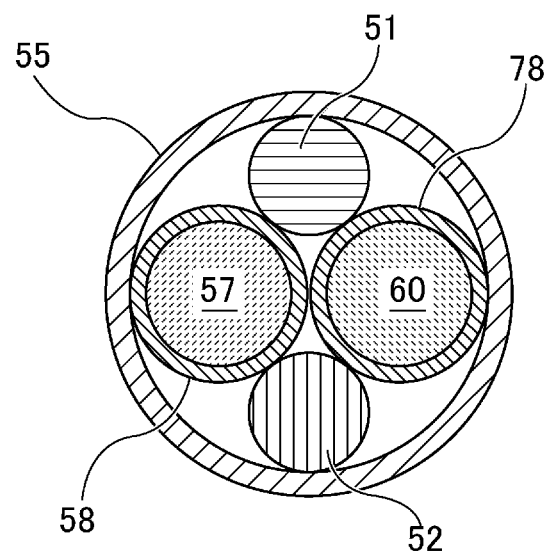
FIG. 8 is a cross-sectional view showing still another embodiment of arrangement of optical fiber cables, cable housing, and flow-passage structure.

FIG. 8 is a cross-sectional view showing another embodiment of the arrangement of the optical fiber cables 51 and 52, the cable housing 55, and the flow-passage structure 58. Configurations of the present embodiment, which will not be particularly described, are the same as those of the embodiment described with reference to FIGS. 3 and 4, and their duplicate descriptions will be omitted.

Figure 9:
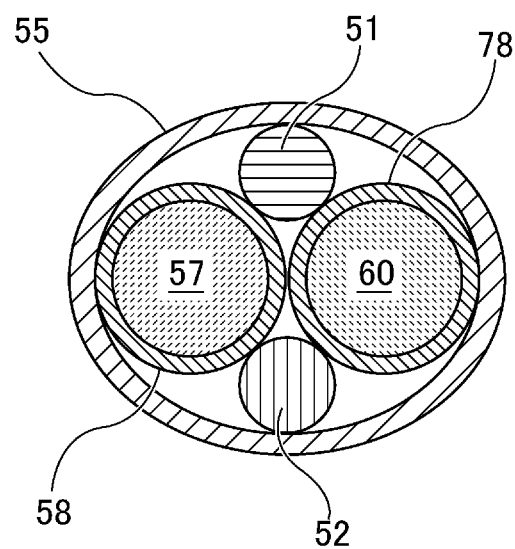
FIG. 9 is a cross-sectional view showing still another embodiment of arrangement of optical fiber cables, cable housing, and flow-passage structure.

In the embodiment shown in FIG. 8, a drain structure 78, which is coupled to the drain line 64 (see FIG. 1), is arranged in the cable housing 55. The drain structure 78 has drain passage 60 formed therein, and the drain line 64 communicates with the drain passage 60. The drain structure 78 is in contact with the inner surface of the cable housing 55, and is in contact with the flow-passage structure 58 and the optical fiber cables 51 and 52. These optical fiber cables 51 and 52 are sandwiched between the cable housing 55 and the flow-passage structure 58 and drain structure 78. Therefore, the light-emitting optical fiber cable 51 and the light-receiving optical fiber cable 52 (particularly their distal ends) are in contact with (or supported by) the inner surface of the cable housing 55, the outer surface of the flow-passage structure 58, and the outer surface of the drain structure 78. As shown in FIG. 9, the cable housing 55 may have an elliptical cross section.

Figure 10:
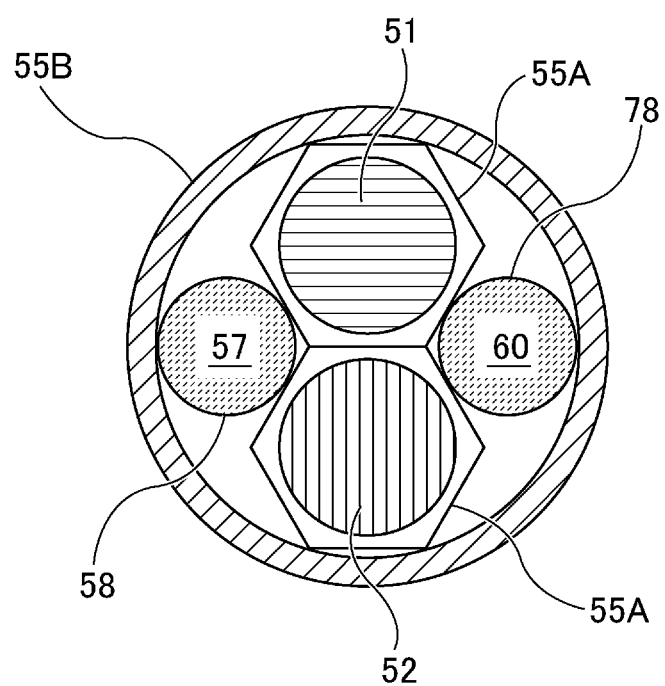
FIG. 10 is a cross-sectional view showing still another embodiment of arrangement of optical fiber cables, cable housing, and flow-passage structure.

FIG. 10 is a cross-sectional view showing another embodiment of the arrangement of the optical fiber cables 51 and 52, the cable housing 55, and the flow-passage structure 58. Configurations of the present embodiment, which will not be particularly described, are the same as those of the embodiment described with reference to FIG. 8, and their duplicate descriptions will be omitted. In the embodiment shown in FIG. 10, the light-emitting optical fiber cable 51 and the light-receiving optical fiber cable 52 are surrounded by two first cable housings 55A, respectively, each having a polygonal cross section. The light-emitting optical fiber cable 51, the light-receiving optical fiber cable 52, and the first cable housing 55A are further surrounded by a second cable housing 55B having a circular cross-sectional shape. The two first cable housings 55A are in surface contact with each other, and are in contact with the inner surface of the second cable housing 55B and the outer surfaces of the flow-passage structure 58 and the drain structure 78. The flow-passage structure 58 and the drain structure 78 are arranged between the outer surfaces of the first cable housings 55A and the inner surface of the second cable housing 55B.

Figure 11:
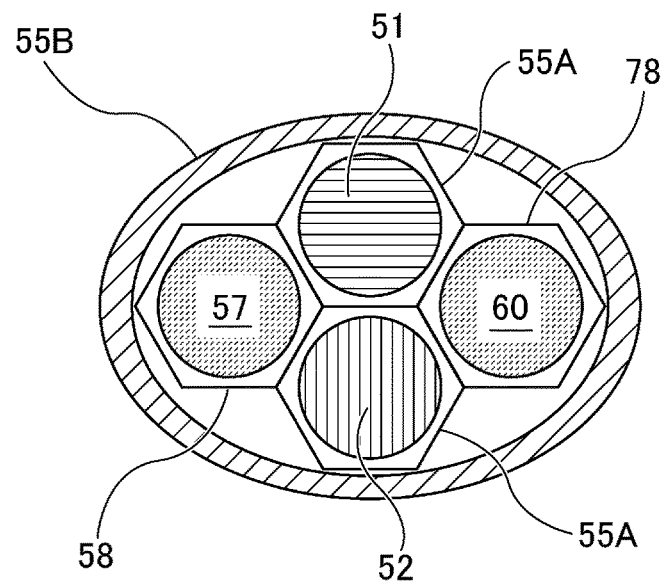
FIG. 11 is a cross-sectional view showing still another embodiment of arrangement of optical fiber cables, cable housing, and flow-passage structure.

FIG. 11 is a cross-sectional view showing another embodiment of the arrangement of the optical fiber cables 51 and 52, the cable housing 55, and the flow-passage structure 58. Configurations of the present embodiment, which will not be particularly described, are the same as those of the embodiment described with reference to FIG. 10, and their duplicate descriptions will be omitted. In the embodiment shown in FIG. 11, each of the flow-passage structure 58 and the drain structure 78 has a polygonal cross section, and the second cable housing 55B has an elliptical cross section.

Figure 12:
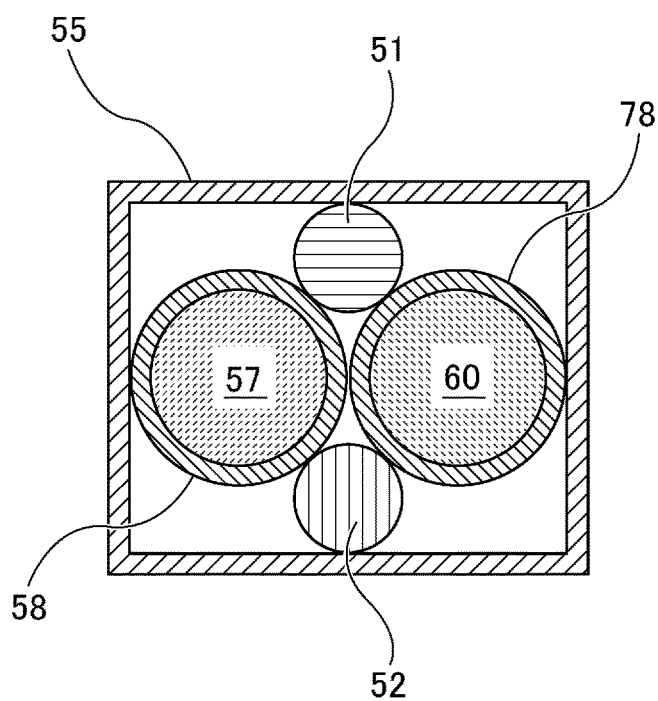
FIG. 12 is a cross-sectional view showing still another embodiment of arrangement of optical fiber cables, cable housing, and flow-passage structure.
Figure 13:
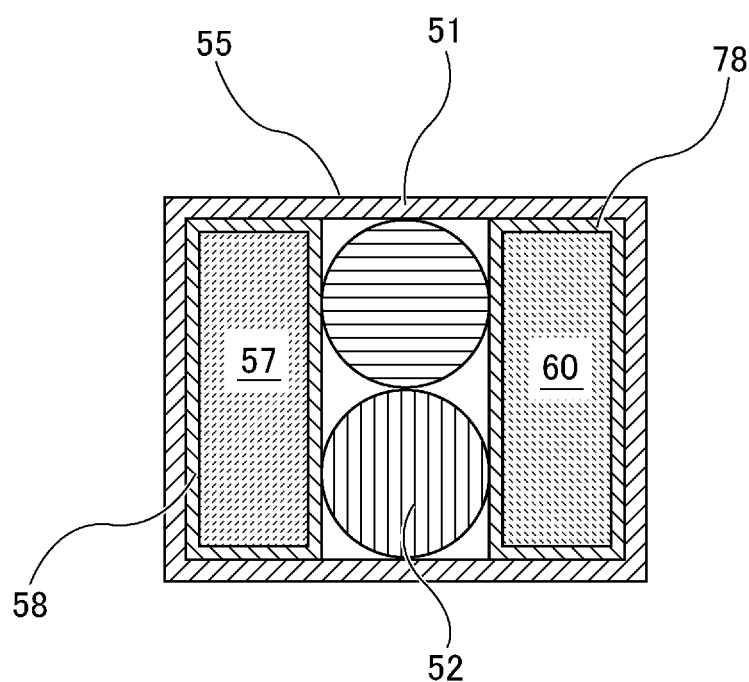
FIG. 13 is a cross-sectional view showing still another embodiment of arrangement of optical fiber cables, cable housing, and flow-passage structure.

As shown in FIGS. 12 and 13, the cable housing 55 may have a rectangular cross section. In the embodiment shown in FIG. 12, the cable housing 55 has a rectangular cross-sectional shape. In the embodiment shown in FIG. 13, the cable housing 55 has a rectangular cross-sectional shape, and each of the flow-passage structure 58 and the drain structure 78 also has a rectangular cross-sectional shape.

Figure 14:
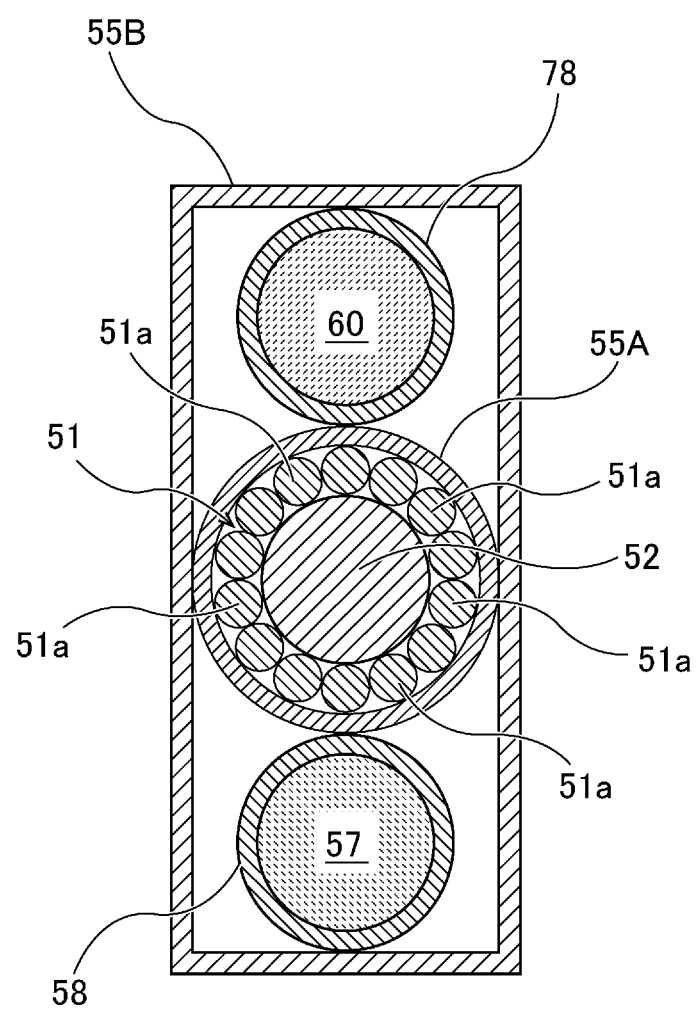
FIG. 14 is a cross-sectional view showing still another embodiment of arrangement of optical fiber cables, cable housing, and flow-passage structure.

As shown in FIG. 14, one or both of the light-emitting optical fiber cable 51 and the light-receiving optical fiber cable 52 may be bundle fiber cable. In the embodiment shown in FIG. 14, the light-emitting optical fiber cable 51 is a bundle fiber cable including multiple fiber cables 51a. The multiple fiber cables 51a constituting the light-emitting optical fiber cable 51 are arranged around the light-receiving optical fiber cable 52. The light-emitting optical fiber cable 51 and the light-receiving optical fiber cable 52 are surrounded by a first cable housing 55A having a circular cross section. The light-emitting optical fiber cable 51, the light-receiving optical fiber cable 52, and the first cable housing 55A are further surrounded by a second cable housing 55B having a rectangular cross section. The second cable housing 55B may have another cross-sectional shape, such as an elliptical shape. In one embodiment, the light-receiving optical fiber cable 52 may be a bundle fiber cable.

The above-described embodiments can be combined as appropriate. For example, the filler 73 described with reference to FIGS. 6 and 7 may be applicable to the embodiments shown in FIGS. 8 to 13.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. An optical film-thickness measuring apparatus to be installed in a polishing apparatus for a workpiece, comprising:
   a light source;
   a light-emitting optical fiber cable coupled to the light source;
   a light-receiving optical fiber cable arranged to receive light reflected from the workpiece;
   a spectrometer configured to measure intensity of the reflected light at each of the wavelengths of the reflected light;
   a data processing device configured to calculate a film thickness of the workpiece from measurement data of the intensity of the reflected light;
   a cable housing surrounding the light-emitting optical fiber cable and the light-receiving optical fiber cable; and
   a flow-passage structure defining a fluid passage adjacent to the light-emitting optical fiber cable and the light-receiving optical fiber cable, the light-emitting optical fiber cable and the light-receiving optical fiber cable being in contact with an inner surface of the cable housing and an outer surface of the flow-passage structure and being supported by both the cable housing and the flow-passage structure.

2. The optical film-thickness measuring apparatus according to claim 1, wherein respective ends of the light-emitting optical fiber cable and the light-receiving optical fiber cable are in contact with the cable housing and the flow-passage structure.

3. The optical film-thickness measuring apparatus according to claim 1, wherein the light-emitting optical fiber cable and the light-receiving optical fiber cable are adhered to each other by an adhesive.

4. The optical film-thickness measuring apparatus according to claim 1, wherein the light-emitting optical fiber cable and the light-receiving optical fiber cable are fixed to the cable housing and the flow-passage structure with an adhesive.

5. The optical film-thickness measuring apparatus according to claim 1, wherein the light-emitting optical fiber cable and the light-receiving optical fiber cable are sandwiched between the cable housing and the flow-passage structure.

6. The optical film-thickness measuring apparatus according to claim 5, wherein the light-emitting optical fiber cable and the light-receiving optical fiber cable are held by a filler that fills a space between the cable housing and the flow-passage structure.

7. The optical film-thickness measuring apparatus according to claim 1, further comprising a buffer tank coupled to the flow-passage structure, the fluid passage communicating with an inside of the buffer tank.

8. A polishing apparatus comprising:
   a polishing table for supporting a polishing pad;
   a polishing head configured to press a workpiece against the polishing pad; and
   the optical film-thickness measuring apparatus according to claim 1.

9. The optical film-thickness measuring apparatus according to claim 1, further comprising a drain structure having a drain passage therein, the light-emitting optical fiber cable and the light-receiving optical fiber cable being in contact with an outer surface of the drain structure.

10. An optical film-thickness measuring apparatus to be installed in a polishing apparatus for a workpiece, comprising:
    a light source;
    a light-emitting optical fiber cable coupled to the light source;
    a light-receiving optical fiber cable arranged to receive light reflected from the workpiece;
    a spectrometer configured to measure intensity of the reflected light at each of the wavelengths of the reflected light;
    a data processing device configured to calculate a film thickness of the workpiece from measurement data of the intensity of the reflected light;
    a first cable housing having a circular cross section, the first cable housing surrounding the light-emitting optical fiber cable and the light-receiving optical fiber cable;
    a flow-passage structure defining a fluid passage adjacent to the light-emitting optical fiber cable and the light-receiving optical fiber cable, the light-emitting optical fiber cable and the light-receiving optical fiber cable being supported by the first cable housing and the flow-passage structure, the light-emitting optical fiber cable comprising a bundle fiber cable including multiple fiber cables which are arranged around the light-receiving optical fiber cable; and
    a second cable housing surrounding the light-emitting optical fiber cable, the light-receiving optical fiber cable, and the first cable housing.

11. An optical film-thickness measuring apparatus to be installed in a polishing apparatus for a workpiece, comprising:
    a light source;
    a light-emitting optical fiber cable coupled to the light source;
    a light-receiving optical fiber cable arranged to receive light reflected from the workpiece;

a spectrometer configured to measure intensity of the reflected light at each of the wavelengths of the reflected light;
a data processing device configured to calculate a film thickness of the workpiece from measurement data of the intensity of the reflected light;
a first cable housing having a circular cross section, the first cable housing surrounding the light-emitting optical fiber cable and the light-receiving optical fiber cable;
a flow-passage structure defining a fluid passage adjacent to the light-emitting optical fiber cable and the light-receiving optical fiber cable, the light-emitting optical fiber cable and the light-receiving optical fiber cable being supported by the first cable housing and the flow-passage structure, the light-receiving optical fiber cable comprising a bundle fiber cable including multiple fiber cables which are arranged around the light-emitting optical fiber cable; and
a second cable housing surrounding the light-emitting optical fiber cable, the light-receiving optical fiber cable, and the first cable housing.

* * * * *